United States Patent [19]

Champomier et al.

[11] Patent Number: 5,779,957
[45] Date of Patent: Jul. 14, 1998

[54] ARTICLE, IN PARTICULAR A BUILDING COVERING PLATE, AND PROCESS FOR MANUFACTURING SAID ARTICLE

[75] Inventors: Claude Champomier, Saint-Avertin; Pascal Soukatchoff, Saint-Christophe, both of France

[73] Assignee: Materiaux De Construction International, Courbevoie, France

[21] Appl. No.: 663,231
[22] PCT Filed: Dec. 5, 1994
[86] PCT No.: PCT/FR94/01415
§ 371 Date: Jul. 29, 1996
§ 102(e) Date: Jul. 29, 1996
[87] PCT Pub. No.: WO95/16644
PCT Pub. Date: Jun. 22, 1995

[30] Foreign Application Priority Data

Dec. 16, 1993 [FR] France .................. 93 15184

[51] Int. Cl.⁶ ........................................... B29C 47/00
[52] U.S. Cl. .............. 264/151; 264/148; 264/211.11; 264/210.2; 428/119; 428/192; 52/539
[58] Field of Search ................. 428/99, 119, 192; 264/148, 151, 177.11, 211.11, 210.2; 52/539; 106/711, 712, 737

[56] References Cited

U.S. PATENT DOCUMENTS

| 4,793,861 | 12/1988 | Sohm ........................... 106/99 |
| 5,108,679 | 4/1992 | Rirsch et al. .................. 264/148 |
| 5,223,200 | 6/1993 | Schulz et al. .................. 264/148 |

FOREIGN PATENT DOCUMENTS

| 3727319 | 12/1988 | Germany . |
| 275307 | 12/1991 | Japan . |
| 145308 | 6/1993 | Japan . |

*Primary Examiner*—Alexander Thomas
*Attorney, Agent, or Firm*—Young & Thompson

[57] ABSTRACT

An article comprising a hydrated matrix containing 100 parts by weight of cement and around 80–120 and preferably around 100 parts by weight of sand with a grain size of less than 1 mm, and alkali-resistant reinforcing glass fibres in a proportion of around 3–4 wt %, preferably 3.5 wt %, relative to the hydrated matrix. The article, which has a density no greater than 1.85, may be used as a covering panel for buildings, and particularly as an imitation slate covering panel.

13 Claims, 3 Drawing Sheets

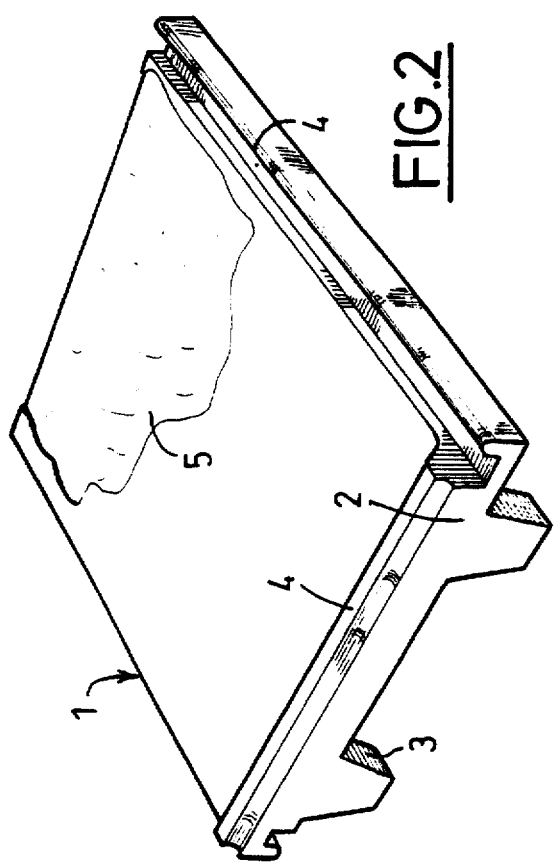
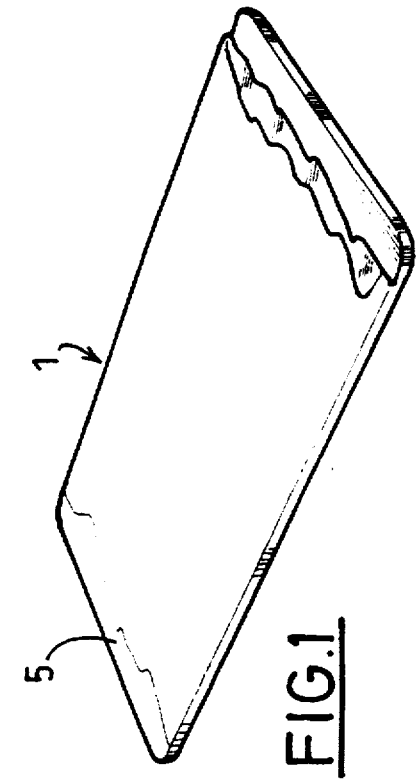
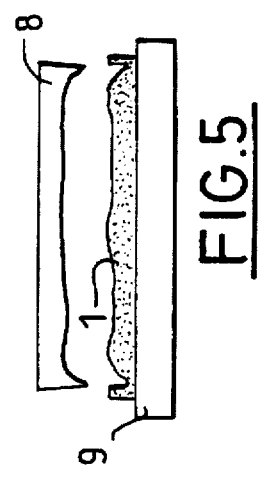
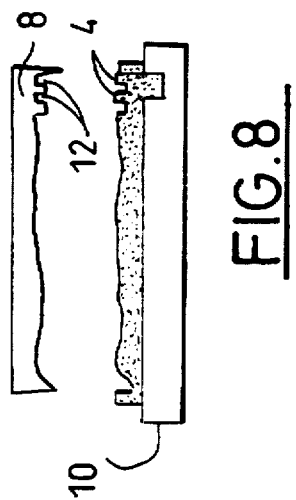
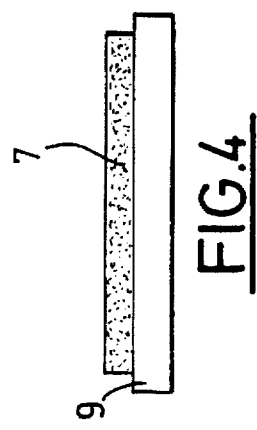
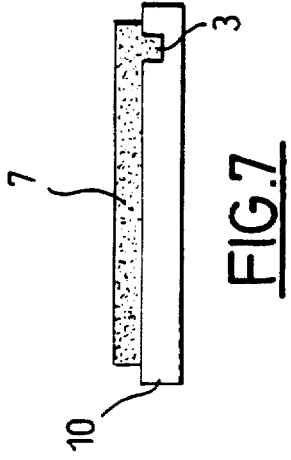
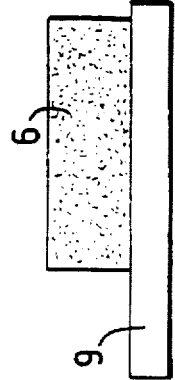
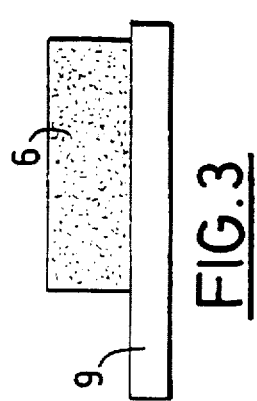

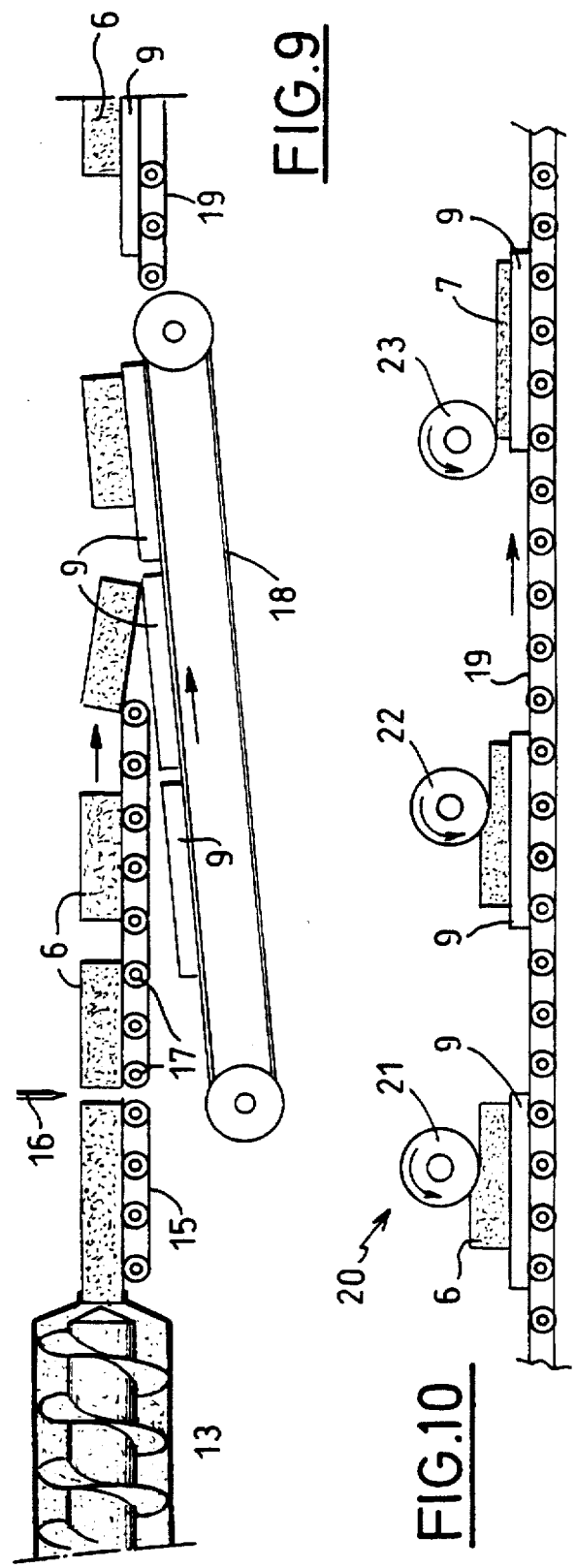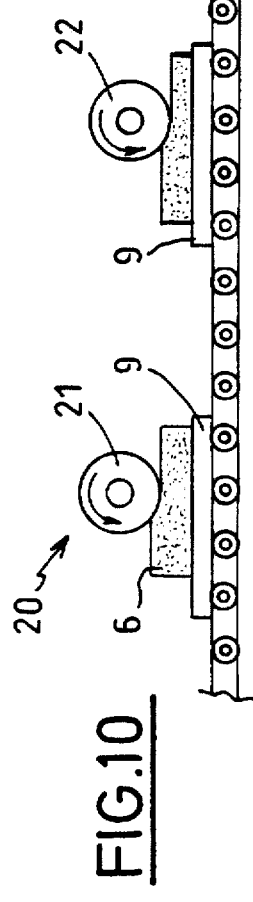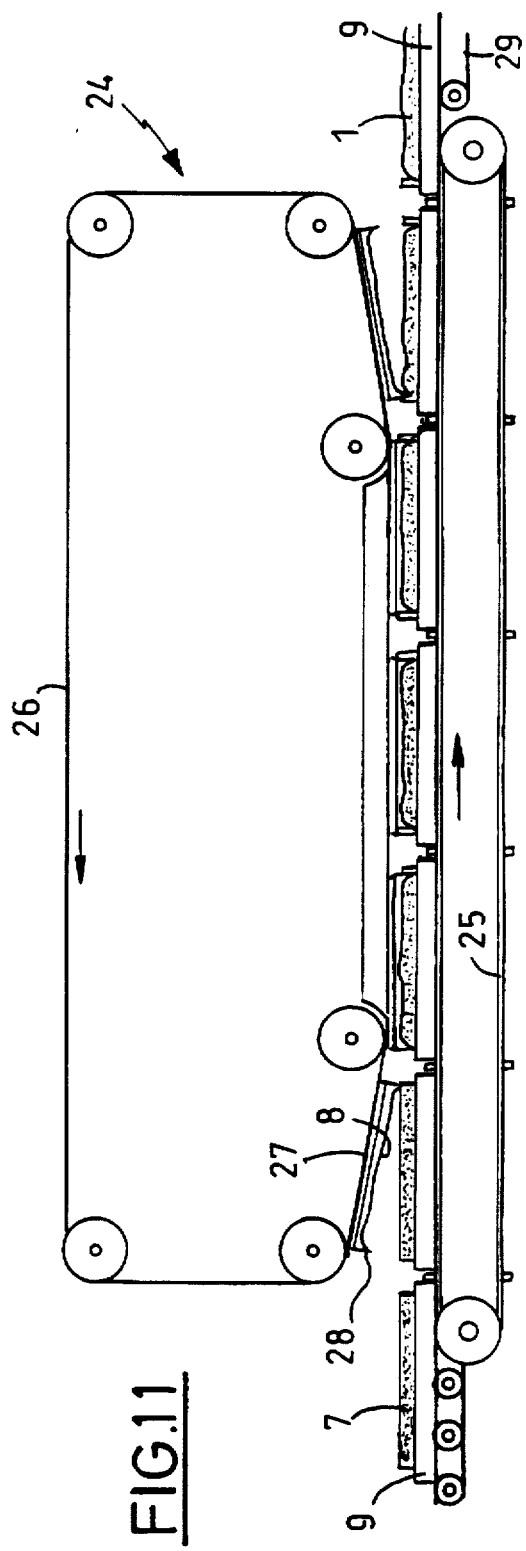

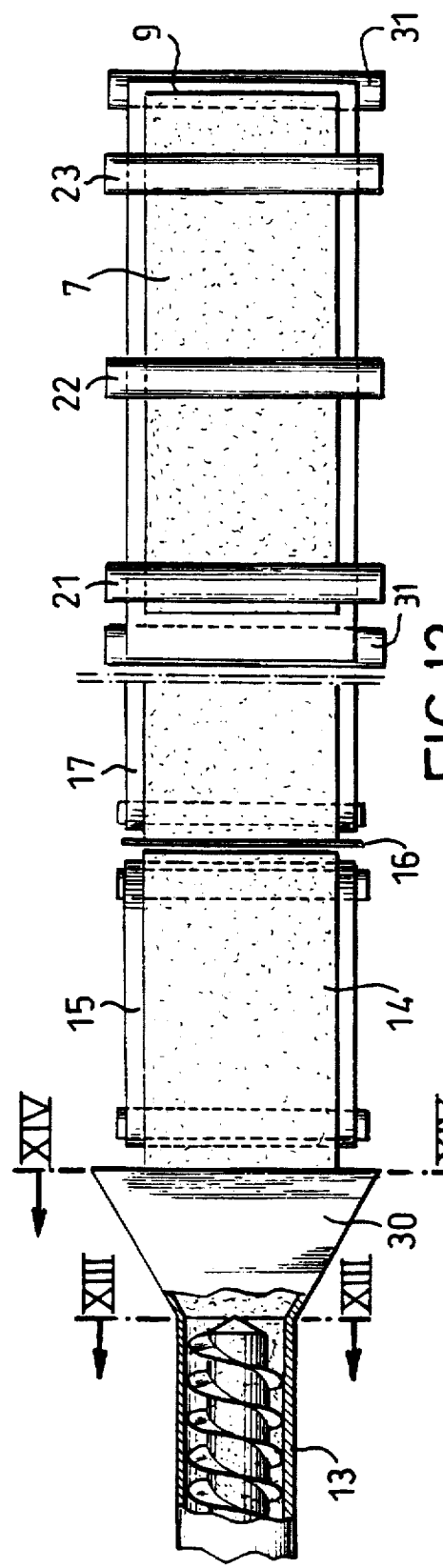
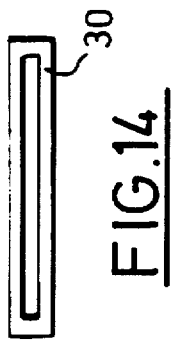
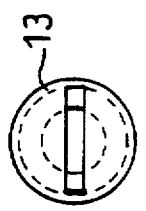
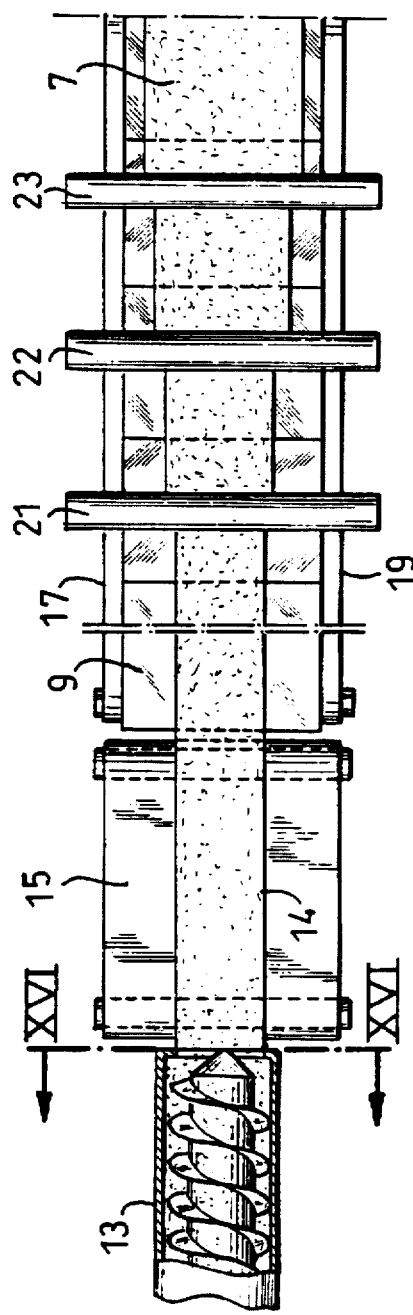
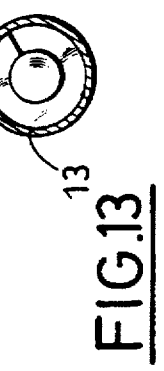

ARTICLE, IN PARTICULAR A BUILDING COVERING PLATE, AND PROCESS FOR MANUFACTURING SAID ARTICLE

FIELD OF THE INVENTION

The present invention relates to a shaped article of the type comprising a hydrated matrix containing cement and sand and reinforced by fibres. It is in particular applicable to covering elements for buildings, for example building roofing plates imitating slate.

BACKGROUND OF THE INVENTION

It has already been proposed, for example in document EP-A-165,388, to produce plates of the aforementioned type shaped by a plastic deformation.

However, these known plates are heavy since they are very dense (specific gravity higher than 2) and fragile and cannot be made in small thicknesses without risk of fracture or cracking.

SUMMARY OF THE INVENTION

An object of the invention is to permit, on the contrary, producing thin plates which may be conveniently used for the covering of buildings, in particular as roofing with the appearance of slate.

The invention therefore provides a shaped article of the aforementioned type, characterized in that the hydrated matrix contains 100 parts by weight of cement and about 80 to 120 parts by weight, preferably about 100 parts by weight, of sand having a grain size of less than 1 mm, and the reinforcing fibres are alkali-resistant glass fibres present in a proportion of about 3 to 4% by weight, preferably about 3.5% by weight, relative to the hydrated matrix, the article having a specific gravity of no more than 1.85.

The shaped article according to the invention may also have one or more of the following features:

the article is constituted by a plate, in particular for the covering of buildings, having a general thickness less than about 1 cm;

the hydrated matrix contains a water/cement ratio by weight between 0.30 and 0.40, and preferably of 0.35;

the glass fibres have a length/diameter ratio between about 100 and 200;

the hydrated matrix further contains ultrafine particles, in particular fumed silica or metakaolin in an amount of about 8 to 12 parts by weight and preferably about 10 parts by weight;

the hydrated matrix further contains an extrusion agent such as carboxymethylcellulose in an amount of about 1 part by weight;

the hydrated matrix further contains a colouring agent, in particular an iron oxide, in an amount of about 4 parts by weight;

the article has a roughly smooth bottom surface and a top surface imitating slate;

the plate has a thickness of no more than 6 mm;

the article comprises along an edge downwardly projecting hooking reliefs or lugs and a top surface imitating slate, optionally provided with ribs ensuring the seal between the articles disposed in overlapping relation.

The invention also provides a process for manufacturing a shaped article in the form of plate, in particular as defined hereinbefore, comprising a hydrated matrix containing cement and sand and reinforced by fibres, said process comprising the following steps:

(a) mixing the constituents until a substantially homogeneous paste is obtained;

(b) extruding the paste in the form of a strip; and, after or before the cutting of said strip;

(c) rolling the strip.

This process may also have one or more of the following features:

the process further comprises a step (d) for shaping the rolled plates by compression, preferably effecting simultaneously the final cutting of the plates to the desired dimensions, the extruded strip has a width substantially equal to that of the plates to be obtained, and the rolling is effected between freely rotatable rolling elements, the extruded strip has a width distinctly less than the width of the plates to be obtained, and the rolling is effected by braking the strip so as to increase the width thereof.

BRIEF DESCRIPTION OF THE DRAWINGS

An example of carrying out the invention will now be described with reference to the accompanying drawings in which:

FIG. 1 is a perspective view of a roofing plate according to the invention;

FIG. 2 is a similar view of another embodiment of the roofing plate according to the invention;

FIGS. 3 to 5 illustrate diagrammatically respectively three successive transforming stages resulting in the plate of FIG. 1;

FIGS. 6 to 8 are views respectively similar to FIGS. 3 to 5 but relating to the plate of FIG. 2;

FIGS. 9 to 11 respectively diagrammatically illustrate three successive stages in the manufacture of a covering plate according to the invention;

FIG. 12 is a diagrammatic plan view of a first manner of carrying out the extruding and rolling steps;

FIGS. 13 and 14 are sectional views taken on lines XIII—XIII and XIV—XIV respectively of FIG. 12;

FIG. 15 is a diagrammatic plan view of a second manner of carrying out the extruding and rolling steps, and;

FIG. 16 is a sectional view taken on line XVI—XVI of FIG. 15.

DETAILED DESCRIPTION OF THE INVENTION

In the example of an application which will now be described, there are made thin plates 1 of black or anthracite colour intended for the roofing of buildings and having the appearance of slate. These plates have a general thickness of about 5 to 6 mm in a "flat" or plain embodiment shown in FIG. 1.

In another embodiment shown in FIG. 2, without reference to the proportions, these plates have a general thickness of about 9 mm and they are provided along an edge 2, constituting in use the top edge of the plate, with downwardly projecting hooking lugs 3 having a height of about 8 mm; they also comprise joint ribs 4 on their top surface alongside said top edge and the two lateral edges. The lateral edges have a thickness which is reduced by about one half, one from the top and the other from the bottom of the plate, and their ribs 4 extend upwardly for the first and downwardly for the second, thereby permitting the fitting of a plate to adjacent plates. Further, the bottom edge of the plate includes a recess adapted to receive the rib 4 of the top edge of the plates situated immediately thereabove.

The plates 1 have typically dimensions ranging from 200×300 mm to 300×600 mm, and are relatively light with specific gravity of about 1.8

In each embodiment, the top surface of the plate 1 defines irregularities 5 imitating slate and termed "slaty cleavage".

The plates 1 are ductile; they have an ultimate tensile strength of about 14 to 18 MPa, and an elongation to fracture of at least 0.15%.

The manufacture of the plates 1 will now be described.

Generally, a paste comprising a number of constituents described in detail hereinafter is prepared by mixing, and this paste is extruded in the form of a relatively thick strip which is cut into blocks 6 (FIG. 3). These blocks are then rolled to produce preliminary plates 7 having roughly the desired final thickness for the general thickness of the plates 1 (FIG. 4). The top surface of the preliminary plates 7 is then shaped by means of shaping plates 8 (FIG. 5) having peripheral cutting edges which effect simultaneously the final cutting of the plates 1 to their desired dimensions. Lastly the plates 1 are stoved.

In the case of the flat plates 1 of FIG. 1, the rolling and the shaping are effected on flat supports 9 (FIGS. 3 to 5), whereas, in the case of the plates 1 having reliefs or lugs 3 of FIG. 2 (FIGS. 6 to 8), supports 10 are used which define recesses 11 into which the paste is forced during the rolling so as to form the lugs 3. As concerns the top ribs 4, they are formed by recesses 12 provided in the shaping plates (FIG. 8).

There will now be described in more detail the manufacture of the plates 1 with a numerical example.

The starting paste is made with the following constituents which form a hydrated matrix reinforced by glass fibres:

(a) Matrix:

a.1 Dry substances:

Portland cement of high quality, for example HPR cement: 100 parts by weight, fumed silica: 10 parts by weight.

fine sand whose particle size is less than 800 μm to 1 mm: 100 parts by weight, extrusion agent (carboxymethylcellulose): about 1 part by weight, black coloring agent (iron oxide): about 4 parts by weight.

a.2 Water: 35 parts by weight or 16% by weight relative to the dry substances.

(b) Reinforcing fibres:

They are alkali-resistant glass fibres present in a proportion of 3.5 by weight relative to the hydrated matrix (dry substancess+water). These fibres may be in particular fibres having a length of 6 to 12 mm formed by 200 filaments 14 μm in diameter, namely a length/diameter ratio between about 100 and 200. Suitable glass fibres are fibres with a non watersoluble spinning material, commercially available under the trademark "cemfil".

All of the aforementioned constituents are mixed in a relatively intense and brief manner to obtain a thick paste having roughly the consistency of plasticine in which the glass fibres remain intact.

In order to describe the successive steps of the treatment of this paste, with reference to FIGS. 9 to 11, the example of the flat plates 1 of FIG. 1 will be taken.

The paste is introduced into a screw extruder 13 (FIG. 9) which plasticizes it and delivers a continuous strip 14 of rectangular section which is deposited on a belt conveyor 15.

A transverse cutting device 16 forms from the strip 14 a succession of blocks 6 which are fed by a second conveyor belt 17 at a higher speed so as to space them apart.

A third conveyor belt 18 carrying a succession of supports 9 is disposed obliquely below the downstream end of the conveyor 17. The speeds are so synchronized that, at the end of the conveyor 15, each support 9 receives a block 6 which is always in the same relative position. Each assembly 6-9 then passes to a fourth conveyor belt 19 which conveys it through a rolling station 20 diagrammatically shown in FIG. 10.

The station 20 carries a train of rolling rolls 21 to 23 disposed transversely above the conveyor 19 and placed progressively closer to the latter. Consequently, the height of each block 6 is reduced in three stages down to a value which is substantially that of the final plate 1 to be obtained.

Each support 9 at the output end of the rolling station therefore carries a thin preliminary plate 7 which is conveyed by the conveyor 19 to a shaping station 24 diagrammatically shown in FIG. 11. At station 24, each support 9 is deposited on a fourth conveyor belt 25 above which a fifth conveyor belt 26 is located. The latter carries bases 27 which are evenly spaced apart and on each of which is fixed a shaping plate 8 whose cutting peripheral edges are indicated at 28. The assemblies 27-8 have been shown in FIG. 11 only on the part of the conveyor belt 26 adjacent the conveyor 25.

The conveyors 25 and 26 are driven in a synchronized manner so that each shaping plate 8 comes to exactly cap the respective preliminary plate 7 by cutting the periphery thereof to the desired dimensions while shaping the top surface of the plate to resemble the aforementioned slaty cleavage.

In this way, when the shaping plates 8 move away from the conveyor 25, the latter deposits on a discharge conveyor 29 the supports 9 carrying the plates 1 of the desired shape which merely need to be stoved to obtain the relatively light and ductile final product imitating slate described hereinbefore.

The production of the plates 1 of FIG. 2 is in every way identical to that just described except that the supports 9 are replaced by the supports 10 of FIGS. 6 to 8 and the shaping plates 8 have the aforementioned recesses 12.

The extrusion produced at 13 is required to impart to the paste the required plasticity for the rolling and shaping. However, this extrusion has for result to orient preferentially the glass fibres whereas it is usually desired to obtain isotropic mechanical properties for the plates 1. It is therefore necessary to reorient the glass fibres after the extrusion, and this can be achieved during the rolling in the manner illustrated in FIGS. 12 to 14 or that illustrated in FIGS. 15 and 16.

In the case of FIGS. 12 to 14, the extruder 13 comprises at its output end a chamber or throat 30 whose section progressively varies from a circular section (FIG. 13) to a flattened section (FIG. 14) having substantially the desired width of the plates 1. The area of the passage decreases between these two sections in a ratio of about 5 to 1.

With such an extruder, the glass fibres of the strip 14, and therefore of the blocks 6 after cutting at 16, are preferentially oriented in the transverse direction. In order to correct this situation, at the station 20, the conveyor 19 is replaced by freely rotatable support rollers 31, some of which are disposed below the rolling rolls 21 to 23, and the latter and/or the rollers 31 are driven in rotation at predetermined speeds. These speeds are so chosen as to longitudinally accelerate the paste as a function of the reduction in thickness produced by each rolling roll and thereby maintain the width of the block 6 substantially constant. This acceleration in turn causes the longitudinal reorientation of the glass fibres and finally results in a substantially homogeneous and isotropic distribution of these fibres.

On the other hand, in the case of FIGS. 15 and 16, the extruder does not include the throat 30 and the extruded strip 14 has a width much less than that of the plates 1; the glass fibres are then preferentially oriented in the longitudinal direction. In order to overcome this anisotropy, the cutting station 16 is placed after the shaping station 24 and the continuous strip 14 is disposed on the supports 9 (or 10) which are in abutting relation to one another. In the rolling station, the supports are carried with no possibility of slip by the conveyor 19. The latter is driven at constant speed while the rolling rolls 21 to 23 are either driven in synchronism with this conveyor 19 or mounted to be freely rotatable. In this way, there is no possibility of a longitudinal sliding of the paste during the rolling and this obliges this paste to spread transversely upon each reduction in thickness at the station 20. Again, there is obtained in this manner a substantially homogeneous and isotropic distribution of the glass fibres in the finished product. As concerns the constituents of the starting paste, the following remarks may be made:

(1) The fumed silica may be present in proportions ranging from about 8 to 12 parts by weight. It has for purpose to facilitate the extrusion by improving the plasticity of the paste and it moreover improves the mechanical properties of the final plate. These effects are insufficient below 8 parts by weight, while the plasticity drops excessively above 12 parts by weight during the extrusion.

Alternatively, the fumed silica may be replaced in the same proportions by other ultrafine particles, in particular by metakaolin which is kaolin treated at 800° C. so that it becomes pozzuolanic. "Ultrafine particles" is generally intended to mean particles whose specific surface area is between 10 and 30 m²/g.

(2) The sand may be present in proportions of 80 to 120 parts by weight. It performs an anti-cracking function. Below 80 parts by weight, the plates 1 have a tendency to crack. Above 120 parts by weight, there is a diminution in the mechanical properties of the plates 1.

(3) The water may be present within a narrow range between 0.30 and 0.40 relative to the weight of the cement. Below 0.30 the paste can no longer be worked, and above 0.40 free water remains in the paste and this results in an excessive porosity of the finished product.

(4) The glass fibres must be present in a proportion of about 3 to 4% relative to the weight of the hydrated matrix. Below 3% the reinforcement is insufficient, and above 4% rheological difficulties appear, i.e. the paste has a plasticity insufficient to enable it to be subjected to the rolling and shaping described hereinbefore.

If the given indications are conformed to, there is obtained a product which may be substituted for slate and is relatively light, little fragile and easy to use. With flat plates of FIG. 1, roofings may be made in the same way as with natural slate plates (two-thirds lapping) while with the plates having hooking lugs of FIG. 2, a much smaller lapping region restricted to above the top ribs 4 is sufficient.

We claim:

1. Process for manufacturing a shaped article in the form of a plate having a specific gravity of no more than 1.85 and isotropic mechanical properties, comprising a hydrated matrix containing cement and sand and reinforced by fibers, the process comprising:

a) mixing to obtain a substantially homogeneous paste, a hydrated matrix containing 100 parts by weight of cement and about 80 to 120 parts by weight of sand having a grain size of less than 1 mm, water with a water/cement ratio by weight between 0.30 and 0.40, and alkali-resistant glass fibers having a length/diameter ratio between 100 and 200, present in a proportion of about 3 to 4% by weight relative to the hydrated matrix;

b) extruding and plasticizing the paste in a screw extruder to form a strip; and c) after or before the cutting of said strip rolling the strip in the form of a plate and reorienting the glass fibers contained therein.

2. Process according to claim 1, further comprising:

d) shaping by compression the rolled plate, and effecting simultaneously a final cutting of the plate to desired dimensions.

3. Process according to claim 1, wherein the extruded strip has a width substantially equal to that of the plate to be obtained, and the rolling is effected between freely rotatable rolling elements.

4. Process according to claim 1, wherein the extruded strip has a width substantially less than the width of the plate to be obtained, and the rolling is effected by breaking the strip so as to increase the width thereof.

5. Process according to claim 1, wherein the hydrated matrix further contains ultrafine particles of fumed silica or metakaolin, in an amount of about 8 to 12 parts by weight.

6. Process according to claim 1, wherein the hydrated matrix further contains an extrusion agent in an amount of about 1 part by weight.

7. Process according to claim 6, wherein the extrusion agent is carboxymethylcellulose.

8. Process according to claim 1, wherein the hydrated matrix further contains a coloring agent in an amount of about 4 parts by weight.

9. Process according to claim 8, wherein the coloring agent is iron oxide.

10. Process according to claim 1, wherein the plate obtained has a general thickness of less than about 1 cm, and is useful as a covering panel for buildings.

11. Process according to claim 10, wherein the plate obtained has a substantially smooth bottom surface and a top surface resembling slate.

12. Process according to claim 11, wherein the plate obtained has a thickness of no more than 6 mm.

13. Process according to claim 10, wherein the plate obtained has along one edge downwardly projecting hooking lugs and a top surface resembling slate, and is provided with ribs for ensuring a seal between plates disposed in overlapping relation.

* * * * *